(12) United States Patent
Tierney

(10) Patent No.: US 7,337,638 B1
(45) Date of Patent: Mar. 4, 2008

(54) ANCHORING DEVICE FOR TEMPORARILY TETHERING AND OBJECT

(76) Inventor: Gene Paul Tierney, 2824 Humboldt Ave. S, Minneapolis, MN (US) 55408

( * ) Notice: Subject to any disclaimer, the term of this patent is extended or adjusted under 35 U.S.C. 154(b) by 147 days.

(21) Appl. No.: 11/226,498

(22) Filed: Sep. 14, 2005

(51) Int. Cl.
*E05B 71/00* (2006.01)
(52) U.S. Cl. .......................... 70/166; 70/170; 70/233; 70/234; 119/789
(58) Field of Classification Search .......... 70/158–173, 70/58, 233–237; 119/786, 788–791; 248/500, 248/503, 551–553; 52/166, 169.7; 410/3, 410/12, 23, 103, 106, 97, 109, 112; 211/5, 211/17; 206/216, 335; 220/375; 215/306; 242/398, 400, 402, 598.5, 598.6; 224/572
See application file for complete search history.

(56) References Cited

U.S. PATENT DOCUMENTS

| | | | | |
|---|---|---|---|---|
| 224,083 A | * | 2/1880 | Furman | 119/790 |
| 364,175 A | * | 5/1887 | Hurd | 119/790 |
| 379,103 A | * | 3/1888 | Coyle | 119/788 |
| 427,012 A | * | 4/1890 | Reed | 119/788 |
| 447,937 A | * | 3/1891 | Brooke | 119/788 |
| 458,737 A | * | 9/1891 | Massey | 119/788 |
| 581,065 A | * | 4/1897 | Conner | 119/790 |
| 642,567 A | * | 2/1900 | Arsneau | 119/789 |
| 745,808 A | * | 12/1903 | Fair et al. | 119/789 |
| 843,954 A | * | 2/1907 | Long | 119/790 |
| 883,782 A | * | 4/1908 | Butcher | 119/790 |
| 1,041,635 A | * | 10/1912 | Kohn | 206/216 |
| 1,470,198 A | | 10/1923 | Miller et al. | |
| 1,497,093 A | | 6/1924 | Dolan | |
| 1,610,720 A | * | 12/1926 | Walton | 473/394 |
| 1,774,439 A | * | 8/1930 | Holtson | 220/86.1 |
| 1,794,386 A | * | 3/1931 | Miller | 220/246 |
| 2,018,534 A | * | 10/1935 | Rike | 220/86.1 |
| 2,180,117 A | * | 11/1939 | Lipsis | 70/236 |
| 2,424,368 A | * | 7/1947 | Oberdorf et al. | 242/382.4 |
| 3,845,643 A | | 11/1974 | Barret | |
| 3,944,079 A | | 3/1976 | Boslough | |
| 3,989,327 A | | 11/1976 | Candelaria | |
| 4,012,930 A | * | 3/1977 | Benson | 70/234 |
| 4,037,441 A | | 7/1977 | Ray | |
| 4,050,583 A | | 9/1977 | Szabo | |
| 4,116,490 A | * | 9/1978 | Huff et al. | 301/37.21 |
| 4,368,455 A | * | 1/1983 | Menard | 340/431 |
| 4,513,938 A | * | 4/1985 | Seymour | 248/507 |
| 5,070,646 A | | 12/1991 | Colombo | |
| 5,088,448 A | * | 2/1992 | Gladding | 119/786 |
| 5,623,843 A | | 4/1997 | Sands | |
| 5,983,685 A | | 11/1999 | Garnsworthy | |

(Continued)

*Primary Examiner*—Lloyd A. Gall
(74) *Attorney, Agent, or Firm*—Dufault Law Firm, P.C.; Dustin R. DuFault

(57) ABSTRACT

An anchoring device positionable within the ground for tethering an object to the ground includes a base portion having a first diameter, and an access aperture having a second diameter. The first diameter of the base portion is greater than the second diameter of the access aperture. At least one wall connects the base portion to the access aperture. The device further includes a tether having a first end secured proximate the base portion and a second end positionable through the access aperture and connectable to the object to be secured. The tether is fully disposable within the anchoring device and is longer than the distance between the base portion and the access aperture.

19 Claims, 12 Drawing Sheets

U.S. PATENT DOCUMENTS 6,138,975 A    10/2000  McDaid
6,416,265 B1 * 7/2002  Flores et al. ............... 410/106
6,539,759 B2   4/2003  Pershall

* cited by examiner

US 7,337,638 B1

ANCHORING DEVICE FOR TEMPORARILY TETHERING AND OBJECT

CROSS-REFERENCE TO RELATED APPLICATION(S)

None.

BACKGROUND OF INVENTION

The present invention generally relates to the field of theft prevention. In particular, the present invention relates to an anchoring device for temporarily tethering an object to the ground when not in use.

There exist in the art several examples of devices which provide temporary securement of a vehicle to the ground for anti-theft purposes. One such example is U.S. Pat. No. 1,470,198 which suggests a weighted chain disposed within a cylindrical tube positioned within concrete or pavement. The chain is prevented from being fully removed from the cylindrical tube by providing an aperture having a lesser diameter than the diameter of the weight attached to the chain. Upon parking a vehicle proximate to the device, the chain can be positioned about a tire, axle or frame of the vehicle, thereby anchoring the vehicle to the ground. Another example is U.S. Pat. No. 5,983,685 which similarly suggests a chain or rod disposed within a cylindrical tube positioned within concrete. In both examples, however, the length of the chain, and more especially the length of the rod, is limited to the length of the tube positioned within the ground. Conversely, the depth at which the tube is buried within the ground determines the length of the chain. In other words, the length of the chain or rod used is directly proportional to the length of the tube, and subsequently, the depth at which the tube must be positioned within the ground. Thus, if it is desired to use a chain having a length of about one yard, the tube must be at least one yard in length and buried into the ground at least one yard. Digging to such a depth may be undesirable for a variety of reasons, including the ease at which the soil can be dug, whether there is a shallow water table, or if such a hole would destroy too much of the surrounding area, especially if the area is part of a lawn or the like. Moreover, if a chain of five yards is desired, a tube of at least five yards must be selected and dug into the ground at least five yards.

Furthermore, the length of the tether determines the proximity the object must be positioned in relation to the device. In certain circumstances, it may be desirable that the object to be tethered not be positioned proximate the device, or alternatively, it may be desirable that the object to be tethered be allowed certain leeway of travel while tethered. This may be the case if the object to be secured is a pet and it is desired that the pet be allowed to travel within a selected radius of the anchoring device. The devices of the prior art do not provide for such.

BRIEF SUMMARY OF INVENTION

The present invention is an anchoring device for temporarily tethering an object to the ground. The anchoring device includes a container positionable with the ground having a flexible tether connected thereto and disposable within. The container includes a base having a first diameter and an access aperture having a second diameter, wherein the first diameter of the base is greater than the second diameter of the access aperture. An inside cavity generally defined by the first diameter of the base and the height of the container allows for storage of excess tether that is greater in length than the height of the container. A first end of the tether connects to the container and a second end of the tether connects to a cap that is positionable over the access aperture of the container. An object to be secured is positionable proximate the anchoring device whereupon the second end of the tether can be retrieved from the container and secured to the object, thereby anchoring the object to the ground. Upon releasing the secured object, the tether is again disposable within the buried container.

DETAILED DESCRIPTION

Figure 1:
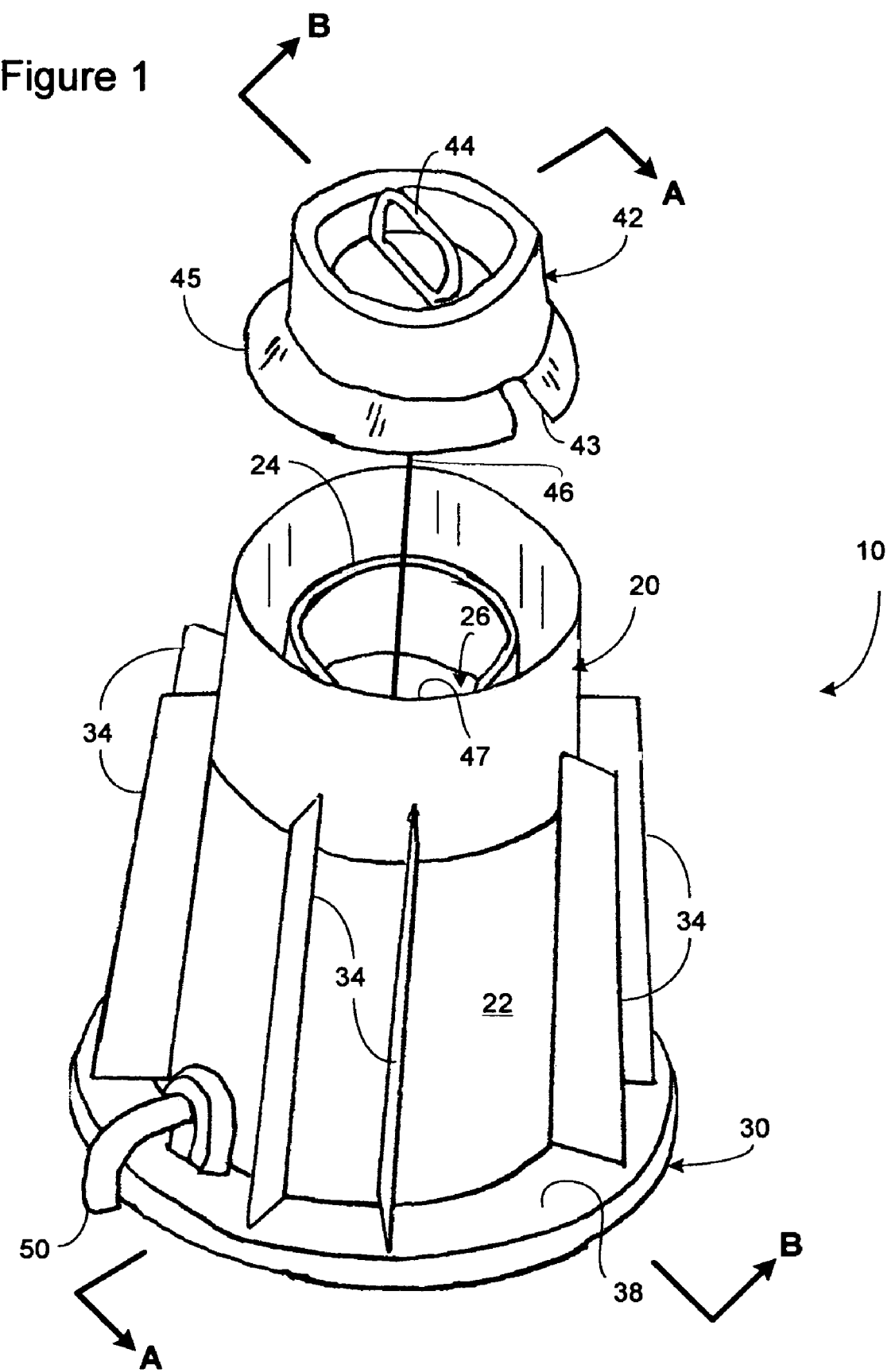
FIG. 1 is a perspective view of an anchoring device of the present invention.

An anchoring device of the present invention is generally indicated at 10 in FIG. 1. The anchoring device 10 is designed to be buried within the ground 12 and provides a tethering mechanism 14 to temporarily secure an object 16 to the ground 12 positioned within the proximate vicinity of the anchoring device 10. Preferably, the object 12 to be secured includes a bicycle. However, other alternative exemplary objects 12 to be secured include, but are not limited to, tricycles, motorcycles, scooters, mopeds, automobiles, trucks, trailers, garbage bins and containers, pets and any like or similar object that may be desirable to temporarily secure.

Figure 2:
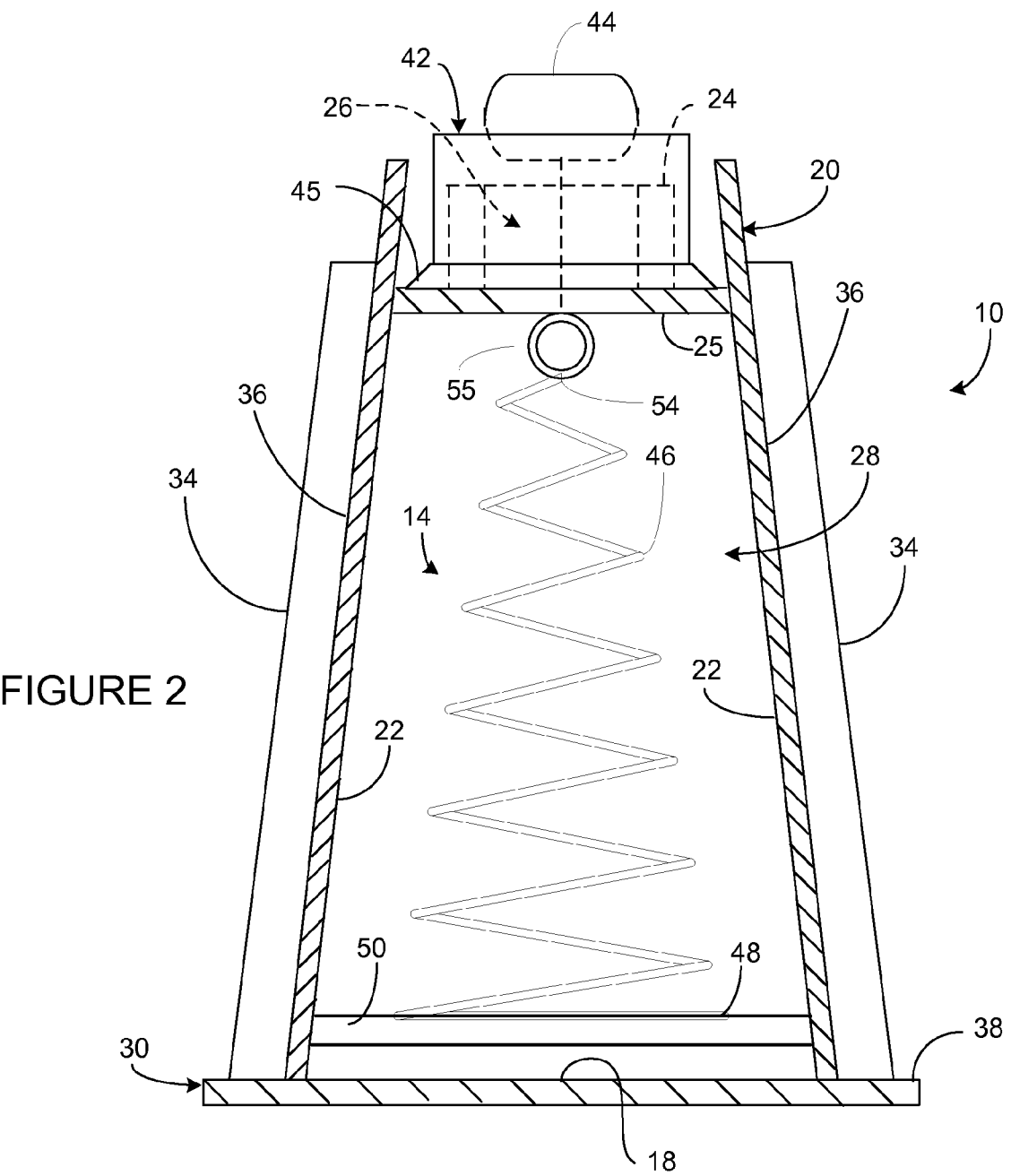
FIG. 2 is a side view of an anchoring device of the present invention taken along lines A-A of FIG. 1.

In a preferred embodiment of the present invention, the anchoring device 10 includes a container defined by a circular lower base 18 and an upper portion 20 connected by a first circumferential wall 22, as illustrated in FIG. 2. A second circumferential wall 24 and circular base 25 defining a minor base member of the upper portion 20 define an aperture 26 positioned within the upper portion 20 to provide access to an inner cavity 28 of the anchoring device 10. The anchoring device 10 further includes a flange member 30 connected to the base portion 18 for providing additional anchoring support to the anchoring device 10 when buried within the ground 12. The flange member 30 may be manufactured as a single unitary member or be a separate and distinctive member. Support members 34 are disposed upon an outer surface 36 of the wall 22 and an upper surface 38 of the flange 30 to provide rigidity to the anchoring device 10.

Figure 3:
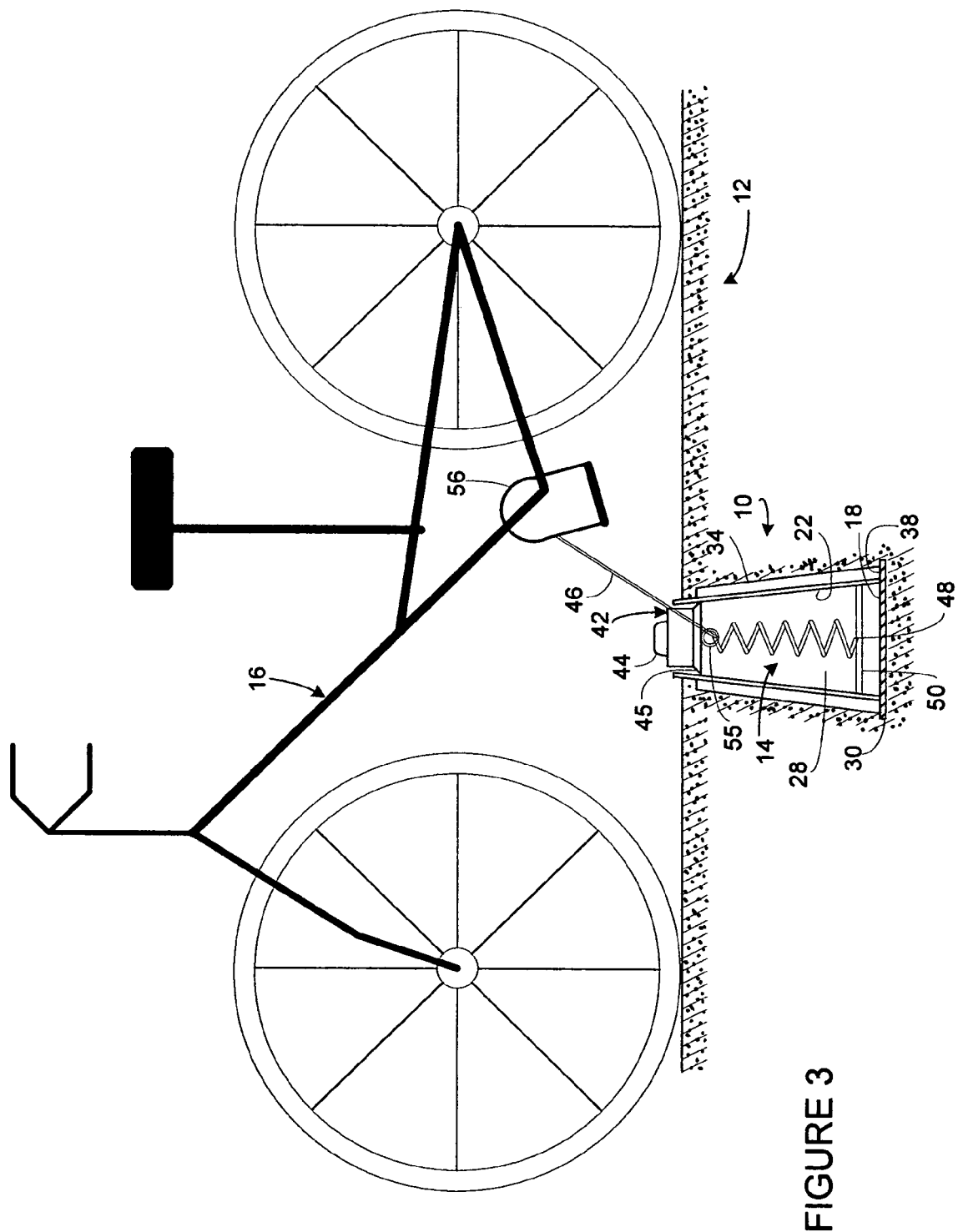
FIG. 3 is a partial side view of an anchoring device of the present invention connected to a bicycle.
Figure 4:
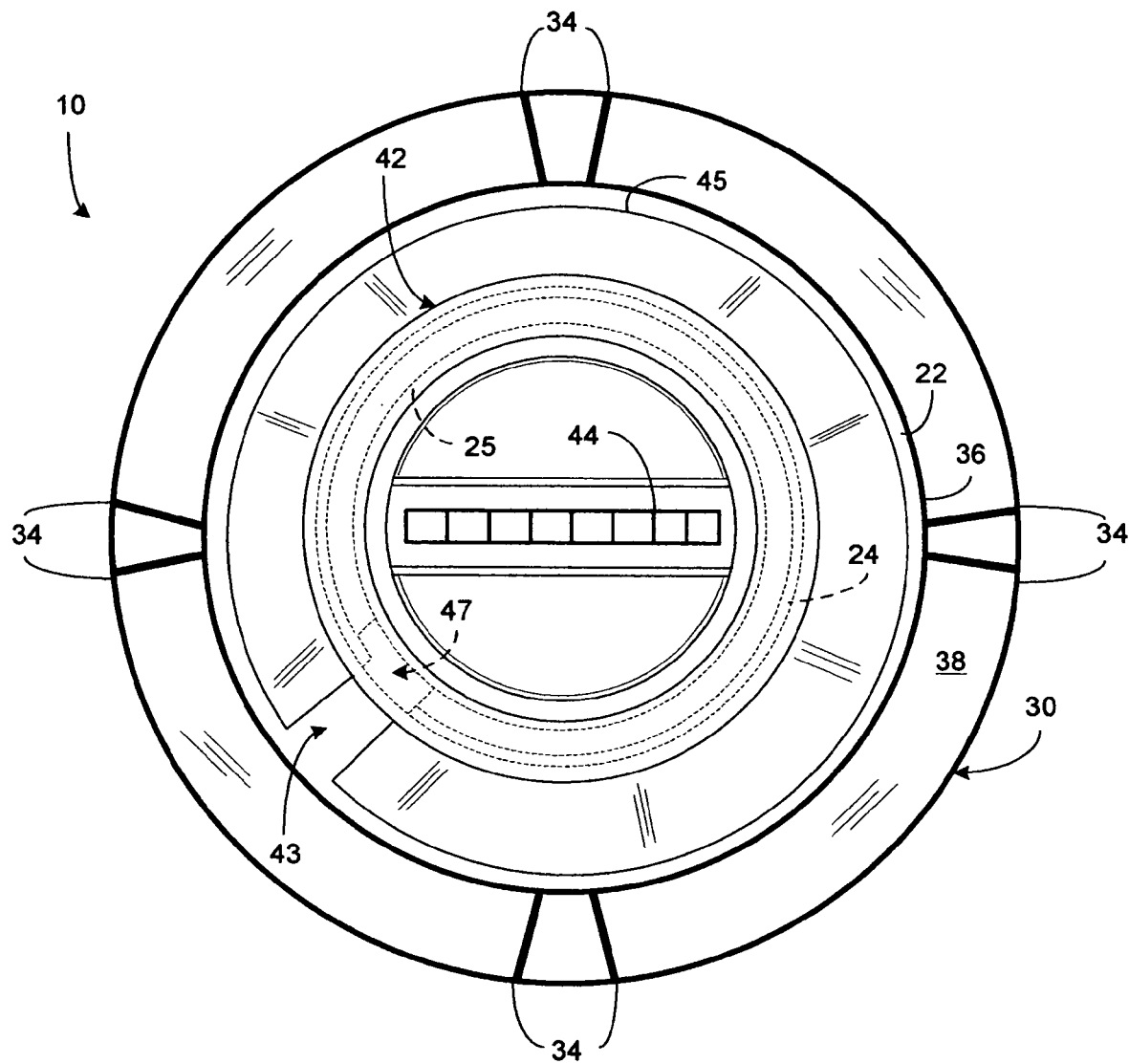
FIG. 4 is a top view of an anchoring device of the present invention.
Figure 5:
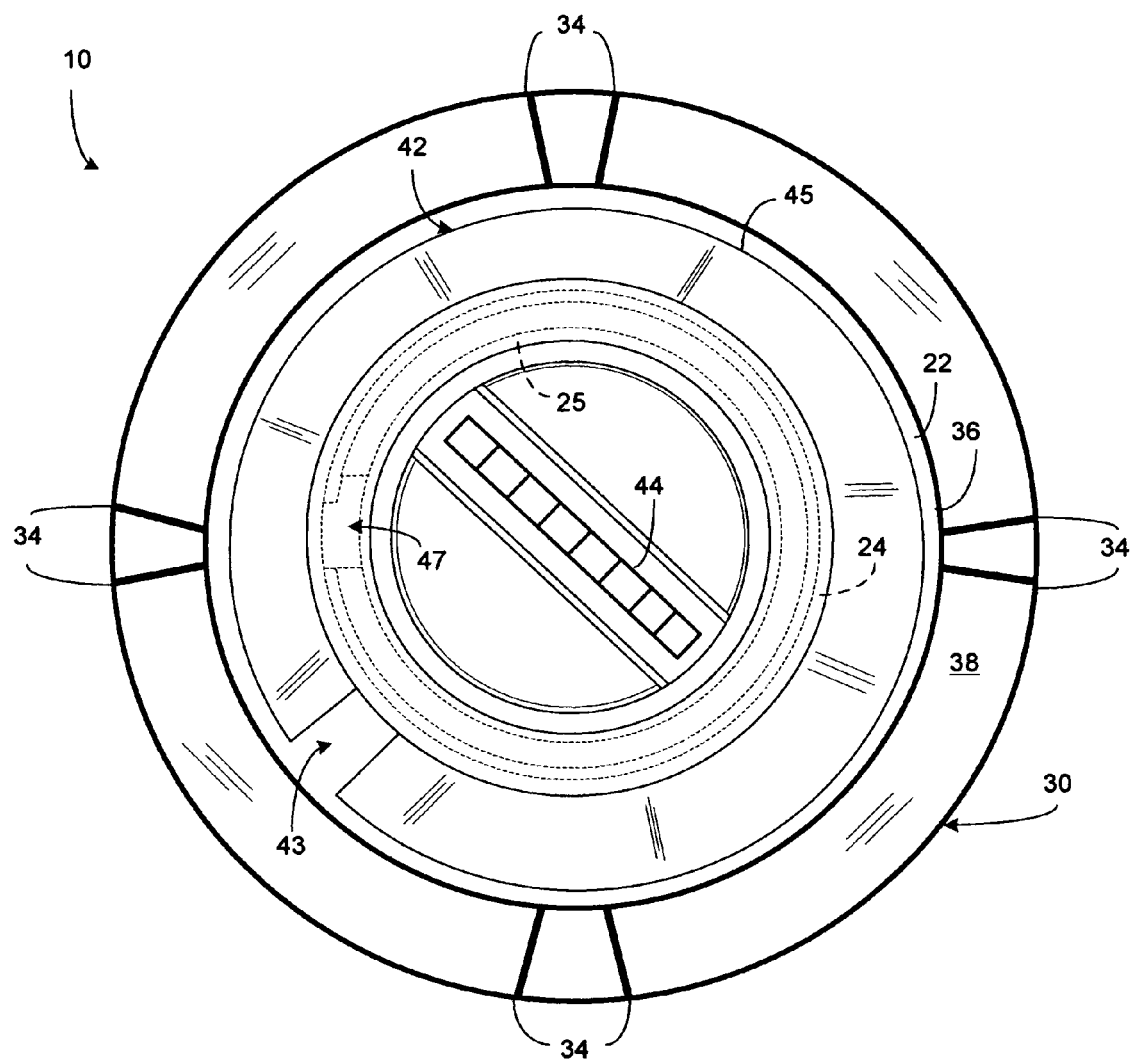
FIG. 5 is a top view of the anchoring device of the present invention.

The anchoring device 10 is positionable within the ground 12 to a depth approximate to the height of the anchoring device 10, preferably such that the top portion 20 of the anchoring device 10 is approximately flush with the level of the ground 12, as illustrated in FIG. 3. Upon being positioned within the ground 12, the anchoring device 10 can be buried with earthen material, including dirt, fill, sand, gravel or a mixture thereof. If aesthetically desired, sod or grass can be planted proximate the upper portion, thus allowing placement of the anchoring device 10 in a yard, garden, field or playground setting. If a more permanent and durable placement of the anchoring device 10 is desired, cement or concrete can be poured to encase the anchoring device 10 and secure the anchoring device 10 within the ground 12, thus allowing placement of the anchoring device 10 in a paved street, concrete driveway or sidewalk. A cap member 42 is positionable about the wall 24 of the upper portion 20 of the anchoring device 10 to prevent debris from entering the anchoring device 10. The cap member 42 includes a slotted aperture 43 positioned upon a frustoconical circumferential lip 45. A handle 44 is attached to the cap 42. As best illustrated in FIG. 4, the cap member 42 is positionable to align the slotted aperture 43 with a key slot 47 positioned within the wall 24 and base 25. Upon mateably aligning the slotted aperture 43 with the key slot 47, a tether 46 can be positioned therethrough, thereby allowing extraction of the tether 46 from the inner cavity 28 while the cap member 42 is positioned over the access aperture 26. When the anchoring device 10 is not in use, the cap member 42 is positionable such that the slotted aperture 43 is not aligned with the key slot 47, as illustrated in FIG. 5, thereby preventing access to the inner cavity 28 and preventing debris from falling therein.

As described, the anchoring device 10 further includes the flexible tether 46 which is disposable within the cavity 28 of the anchoring device 10. In the preferred embodiment of the present invention, the tether 46 is a self-coiling bike cable as commonly manufactured by such companies as Kryptonite Corporation of Canton, Mass., Thule AB of Malmo, Sweden or Master Lock Company of Oak Creek, Wis. Alternatively, the tether 46 can be of any type of flexible material suitable of withstanding high tensile forces including, but not limited to, chain link, wire cable, bike cable, nylon rope and the like. A first end 48 of the tether 46 secures to a shaft 50 disposed within the cavity 28 and attached to the wall 22 of the anchoring device 10. Preferably, the attachment of the shaft 50 is proximate the lower base 18 of the anchoring device 10 to prevent entanglement of the tether 46 upon disposing the tether 46 within the cavity 28 of the anchoring device 10. However, it should be noted that other means of attachment of the first end 48 of the tether 46 to the anchoring device 10 are well within the scope of the present invention, including but not limited to, screws, bolts, adhesives, knots and the like. It is also within the scope of the present invention to attach the first end 48 of the tether 46 directly to the base 18, the wall 22 or the upper portion 20 of the anchoring device 10.

Figure 6:
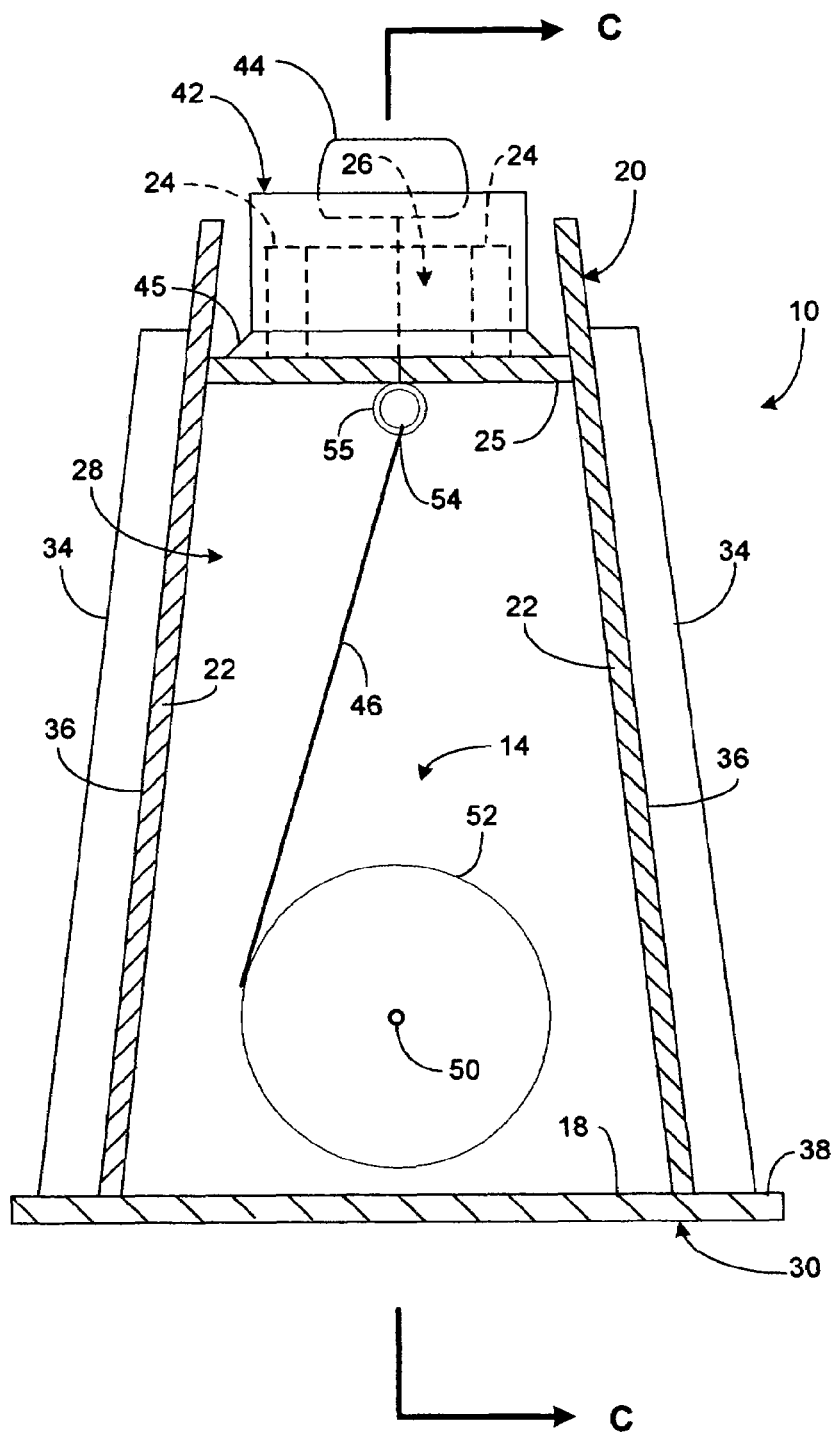
FIG. 6 is a side view of an alternative embodiment of the anchoring device of the present invention taken along lines B-B of FIG. 1.
Figure 7:
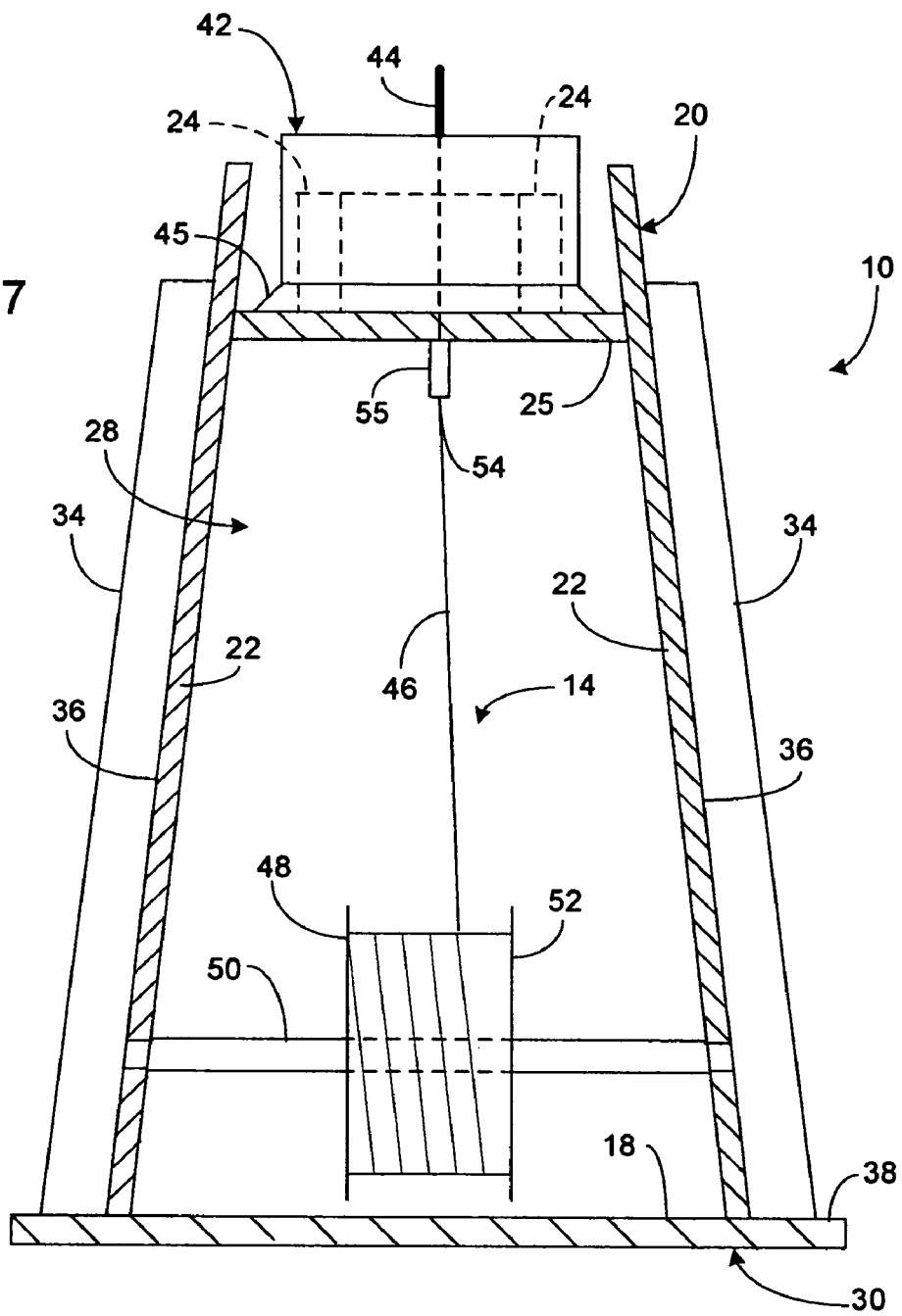
FIG. 7 is a side view of an alternative embodiment of the anchoring device of the present invention taken along lines C-C of FIG. 6.
Figure 8:
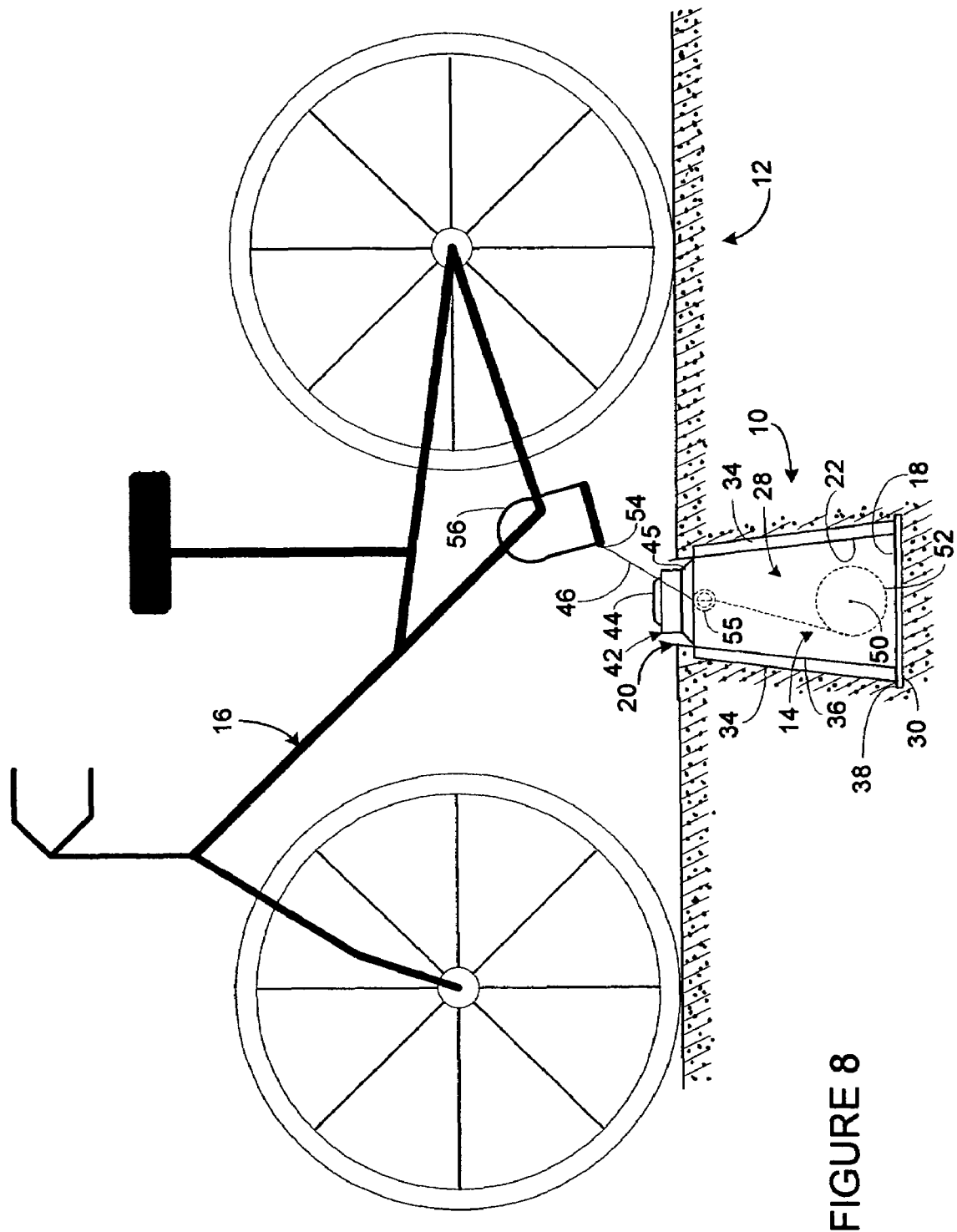
FIG. 8 is a partial side view of an anchoring device of the present invention connected to a bicycle.

Alternatively, as illustrated in FIGS. 6, 7 and 8, the anchoring device 10 includes a spring-biased, self-retractable coil 52 having a tether 46 disposed thereon. The self-retractable coil 52 provides constant tension to the tether 46. Upon pulling the tether 46, the tether 46 unwraps from the coil 52 where the tether 46 can be secured to the bicycle 16. Upon returning the tether 46 to the anchoring device 10, the retractable coil 52 wraps the tether 46 about the coil 52.

In either embodiment, an opposing second end 54 of the tether 46 connects to the cap 42 by insertion through an eyelet 55 attached to the handle 44. Slidable attachment of the second end 54 to eyelet 55 of the cap 42 prevents the tether 46 from falling into the cavity 28 of the anchoring device 10 where it may be difficult for the user to retrieve the tether 46. Furthermore, the eyelet 55 allows travel of the tether 46 through the aligned slotted aperture 43 and key slot 47 as described herein. Alternatively, positioning of the tether 46 can be achieved by removal and positioning of the cap member 42.

The minimum length 46 of the tether must be greater than the depth at which the first end 48 is attached to the shaft 50 (or any selected position of attachment to the anchoring device 10), as measured from the shaft 50 to the access aperture 26. Preferably, the length of the tether 46 is at least twice as long as the depth at which the first end 48 is attached to the shaft 50. More preferably, the length of the tether 46 is at least three times as long as the depth at which the first end 48 is attached to the shaft 50. Most preferably, the length of the tether 46 is at least four times as long as the depth at which the first end 48 is attached to the shaft 50. Being that the tether 46 is of a greater length than the height of the anchoring device 10, the cavity 28 must be of sufficient volume to accommodate the excess tether 46 not in use without being too great in depth so as to minimize the depth at which the ground 12 must be dug to accommodate the anchoring device 10 upon positioning within the ground 12 and yet still provide for sufficient anchorability at a shallow depth. This is accomplished by providing the lower base 18 with a greater diameter than the access aperture 26. The circumferential wall 22 extending from the lower base 18 is therefore skewed in relation to the base 18, thereby providing an inverted frustoconical shape. The cavity 28 also has an inverted frustoconical shape as well, and allows for the accumulation of the tether 46 when disposed therein.

Upon positioning the cap member 42 to align the slotted aperture 43 with the key slot 47, the tether 46 can be withdrawn from the anchoring device 10 and secured to the bicycle 16 parked proximately to the anchoring device 10. Securement of the tether 46 to the bicycle 16 can be accomplished by a fastening mechanism 56 including, but not limited to, the use of a bike lock, tying the tether to the frame, or hooking the tether onto the frame with en eye hook. When it becomes desirable to use the bicycle 16 again, the user detaches the tether 46 from the bicycle 16, and either directs the tether 46 into the cavity 28 of the anchoring device 10, or the tether 46 is urged back into the cavity 28 of the anchoring device 10 under the bias of the self-retractable coil 52. Upon disposing the tether 46 within the cavity 28 of the anchoring device 10, the cap 42 can be positioned to misalign the slotted aperture 43 from the key slot 47.

Figure 9:
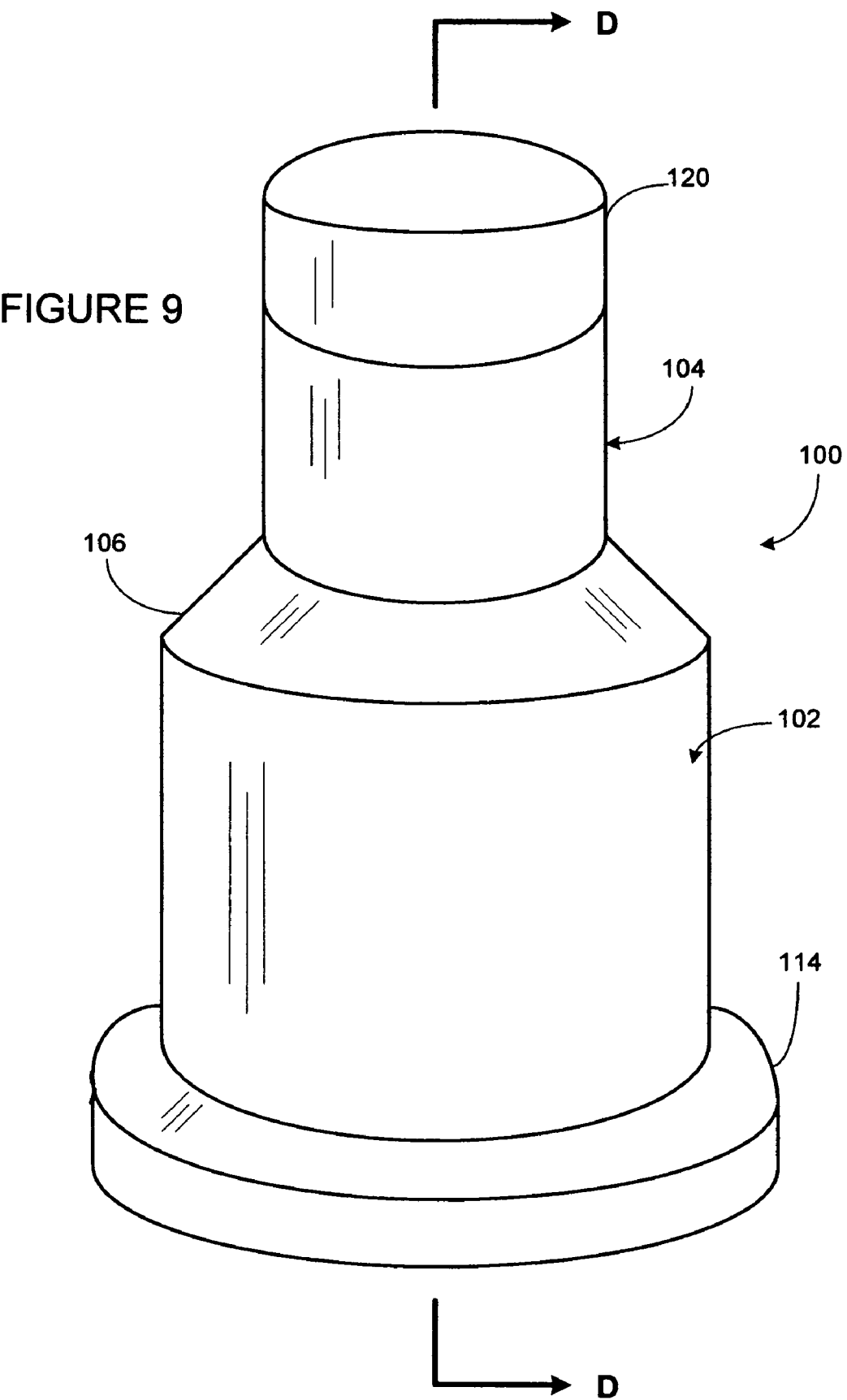
FIG. 9 is a perspective view of an alternative embodiment of an anchoring device of the present invention.
Figure 10:
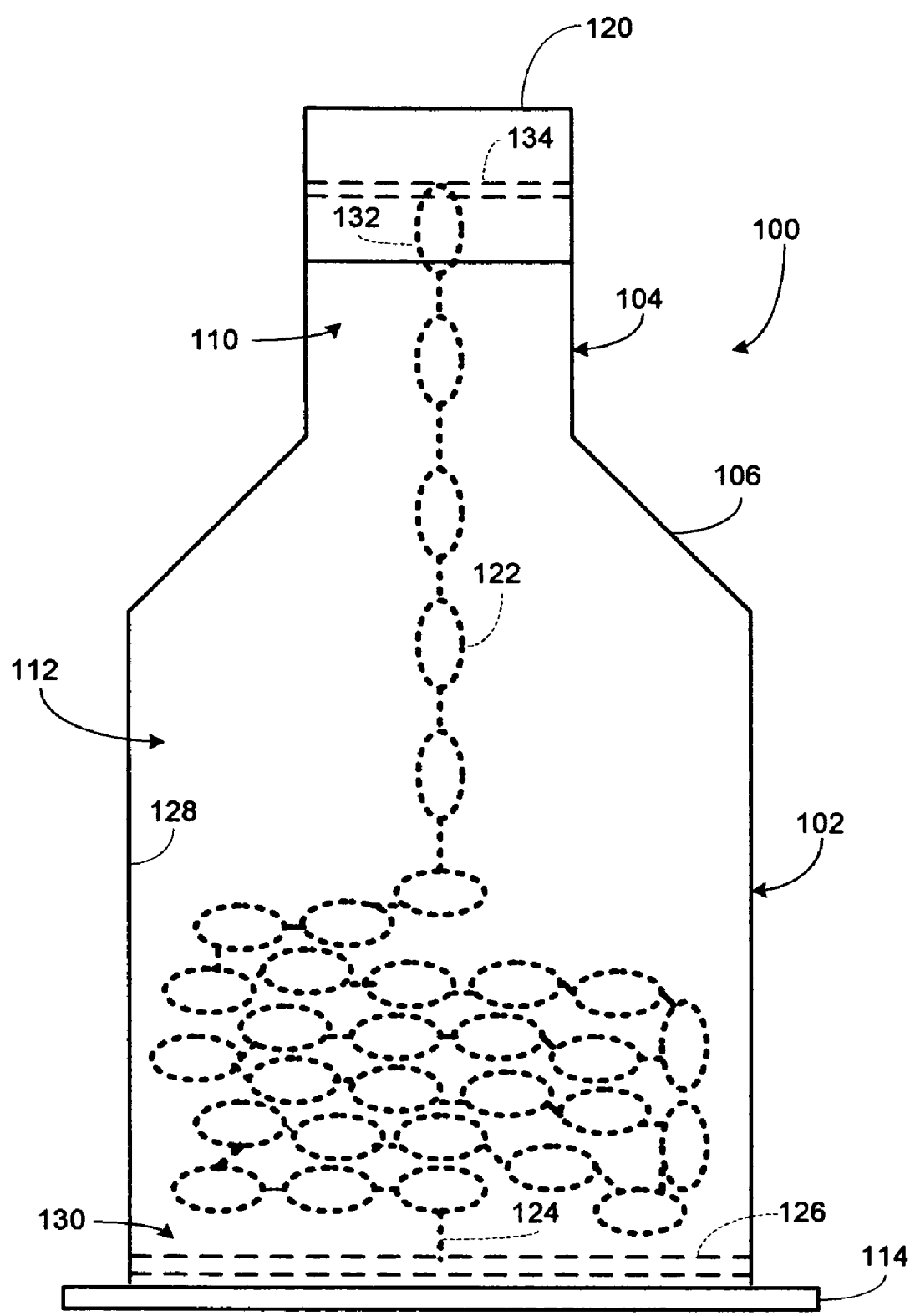
FIG. 10 is a side view of the alternative embodiment of an anchoring device of the present invention taken along lines D-D of FIG. 9.
Figure 11:
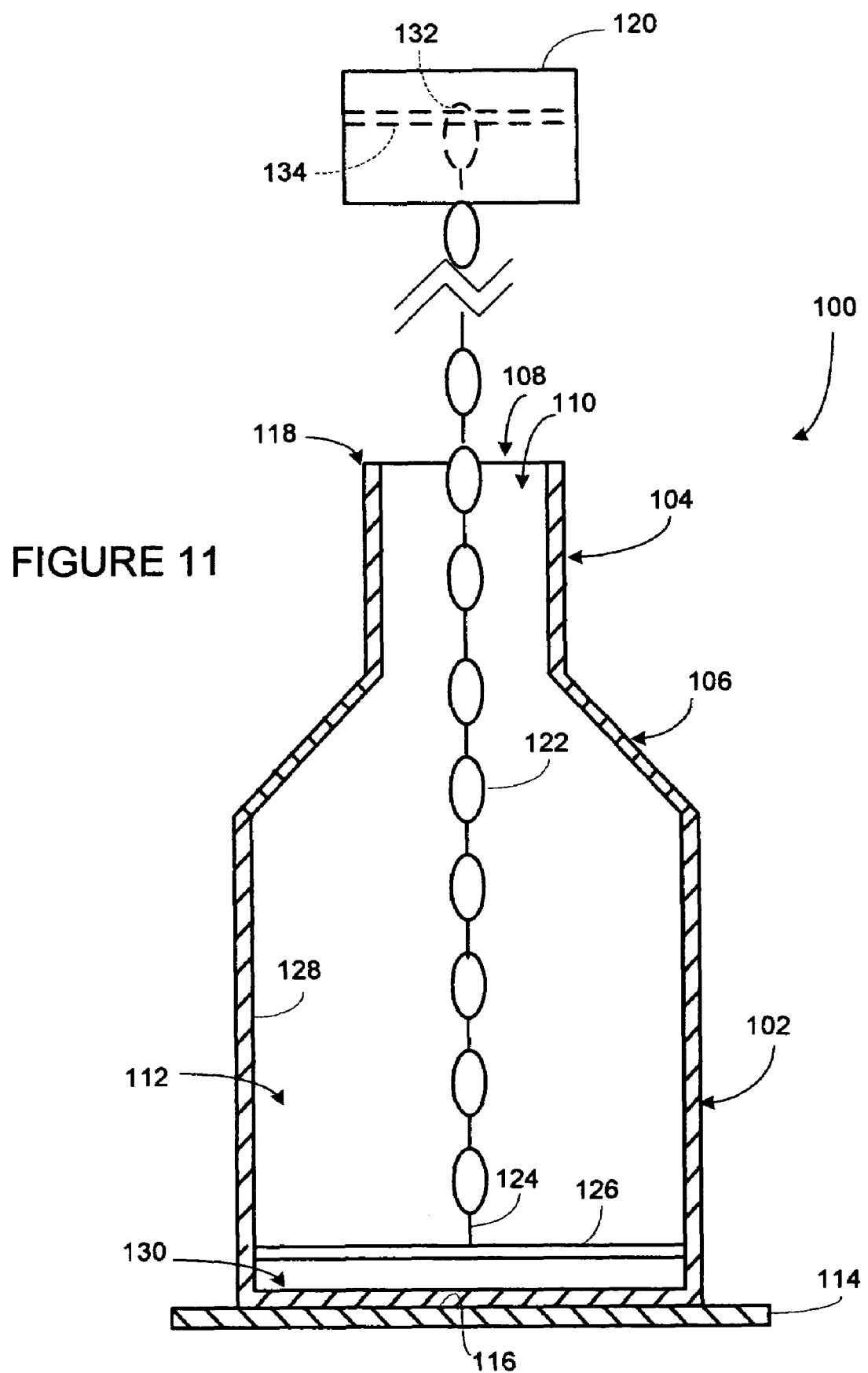
FIG. 11 is a partial side view of the alternative embodiment of an anchoring device of the present invention with a cap member removed taken along lines D-D of FIG. 9.

Referring now to FIGS. 9 and 10, an alternative embodiment of the anchoring device of the present invention is generally indicated at 100. The anchoring device 100 includes a main body portion 102 and an upper neck portion 104 connected by a frustoconical wall 106. The upper neck portion 104 includes an aperture 108 providing access to an inner neck cavity 110 and subsequently an inner main body cavity 112. The anchoring device 100 further includes a flange member 114 connected to main body portion 112 for providing additional anchoring support to the anchoring device 100 when buried within the ground 12. The flange member 114 may be manufactured as a single unitary member or be a separate and distinctive member attached to an outer undersurface 116 of the main body portion 112, as is illustrated in FIG. 11.

Figure 12:
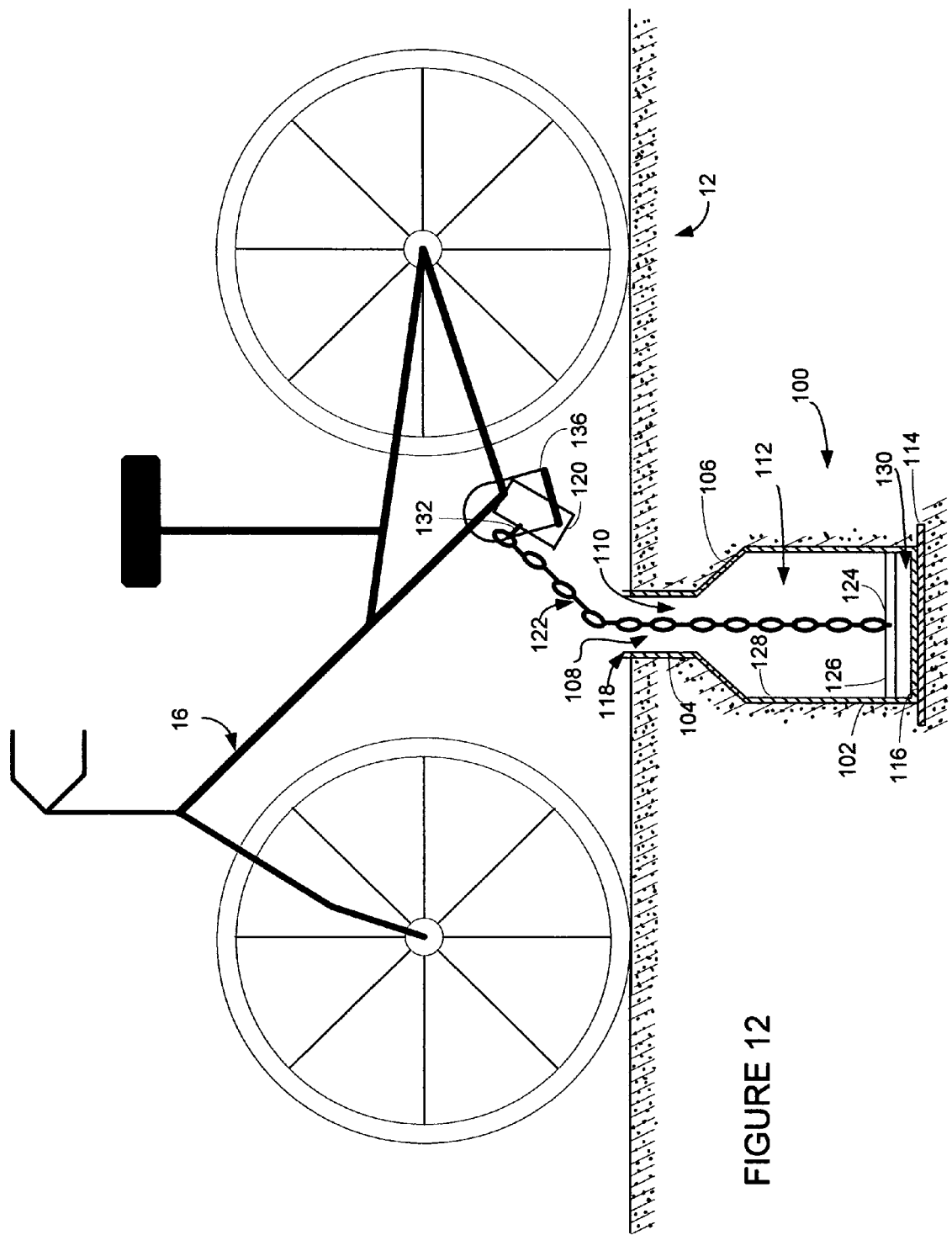
FIG. 12 is a partial side view of the alternative embodiment of an anchoring device of the present invention connected to a bicycle.

The anchoring device 100 is positionable within the ground 12 to a depth approximate to the height of the anchoring device 100, preferably such that a top portion 118 of the upper neck 104 is nearly flush with the ground level, as illustrated in FIG. 12. Upon being positioned within the ground 12, the anchoring device can be buried with earthen material, including dirt, fill, sand, gravel or a mixture thereof. If aesthetically desired, sod or grass can be planted proximate the upper neck portion 104, thus allowing placement of the anchoring device 100 in a yard, garden, field or playground setting. If a more permanent and durable placement of the anchoring device 100 is desired, cement or concrete can be poured to encase the anchoring device 100 and secure the anchoring device 100 within the ground, thus allowing placement of the anchoring device 100 in a paved street, concrete driveway or sidewalk. A cap member 120 is positionable over the upper neck 104 of the anchoring device 100 to prevent debris from entering therein.

To secure the bicycle 16 to the anchoring device 100, the anchoring device 100 further includes a flexible tether 122 disposable within the inner neck cavity 110 and the main body cavity 112 of the anchoring device. As described herein with respect to the preferred embodiment of the present invention, the tether 122 of the alternative embodiment can be a self-coiling bike cable. Alternatively, the tether 122 can be of any type of flexible material suitable of withstanding high tensile forces including, but not limited to, chain link, wire cable, bike cable, nylon rope and the like. For purposes of illustration, a chain-link tether 122 is exemplified in FIGS. 8, 9 and 10. A first end of the tether 124 secures to a shaft 126 disposed within the main body cavity 112 and attached to a wall 128 of the main body portion 102. Preferably, the attachment of the shaft 126 is proximate a bottom portion 130 of the main body 102 to prevent entanglement of the tether 122 upon disposing the tether 122 within the neck and main body cavities, 110 and 112, respectively. However, it should be noted that other means of attachment of the first end 124 of the tether 122 to the anchoring device 100 are well within the scope of the present invention, including but not limited to, screws, bolts, adhesives, knots and the like. It is also within the scope of the present invention to attach the first end 124 of the tether 122 directly to the bottom portion 130, the main body 102, the frustoconical wall 106 or the neck portion 104. It is also within the scope of the present invention that the anchoring device 100 can include a spring-biased, self-retractable coil (not shown) with a wire cable or nylon rope disposed thereon, as described and illustrated herein with respect to anchoring device 10 of the preferred embodiment. The self-retractable coil (not shown) provides constant tension on the tether 122, as fully described herein. Regardless the type of tether selected, an opposing second end 132 of the tether 122 attaches to the cap 120 by means of a bolt 134. Attachment of the second end 132 to the cap 120 prevents the tether 122 from falling into the main body cavity 112 wherein it may be difficult for the user to retrieve the tether 122.

The minimum length of the tether 122 must be greater than the depth at which the first end 124 is attached to the shaft 126 (or any selected position of attachment to the anchoring device), as measured from the shaft 126 to the access aperture 108 of the neck portion 104. Preferably, the length of the tether 122 is at least twice as long as the depth at which the first end 124 is attached to the shaft 126. More preferably, the length of the tether 122 is at least three times as long as the depth at which the first end 124 is attached to the shaft 126. Most preferably, the length of the tether 122 is at least four times as long as the depth at which the first end 124 is attached to the shaft 126. Being that the tether 122 is of a greater length than the height of the anchoring device 100, the inner main body cavity 112 must be of sufficient volume to accommodate the excess tether without being too great in depth, so as to minimize the depth at which the ground 12 must be dug to accommodate the anchoring device 100, and yet still provide for sufficient anchorability at a shallow depth. This is accomplished by providing the main body portion 102 with a greater diameter than the neck portion 104. The volume of the inner main body cavity 112 (as defined by the diameter and height of the main body portion 102) allows for the accumulation of the tether 122 when disposed therein, as illustrated in FIG. 8.

Upon removing the cap 120 from the neck portion 104, the tether 122 can be withdrawn from the anchoring device 100 and secured to the bicycle 16 parked proximately to the anchoring device 100. Securement of the tether 122 to the bicycle can be accomplished by a fastening mechanism 136 including, but not limited to, the use of a bike lock, tying the tether and cap to the frame, or hooking the tether onto the frame with en eye hook. When it becomes desirable to use the bicycle again, the user detaches the tether 122 from the bike, and either directs the tether 122 into the anchoring device 100, or the tether 122 is urged back into the anchoring device 100 under the bias of the self-retractable coil (not shown). Upon disposing the tether 122 within the anchoring device 100, the cap 120 can be positioned over the access aperture 108 and disposed upon the upper neck portion 104 of the anchoring device 100.

Although the present invention has been described with reference to preferred embodiments, workers skilled in the art will recognize that changes may be made in form and detail without departing from the spirit and scope of the invention

The invention claimed is:

1. A device for anchoring a vehicle to the ground, the device comprising:
 a container positionable within the ground, the container including a bottom base portion connected to a first circumferential wall;
 a second circumferential wall having a lesser diameter than the first circumferential wall, the second circumferential wall fixedly connected to and at least partially disposed within the container, the second circumferential wall including a first slotted aperture;
 a flexible tether disposable within the container, the tether having a first end and a second end, the first end attached to the container, the second end connectable to the vehicle, wherein the tether has a length greater than a height of the container; and
 a cap member positionable within the container and rotationally disposable about the second circumferential wall, the cap member including a second slotted aperture, the cap member rotatably positionable about the second circumferential wall to cooperably align the second slotted aperture with the first slotted aperture, wherein the tether is slidably disposable between the first and second slotted apertures.

2. The device of claim 1 wherein the base portion has a larger diameter than the first circumferential wall.

3. The device of claim 2, wherein the first circumferential wall is skewed from perpendicular relative to the base portion.

4. The device of claim 1, wherein the first end of the tether attaches to the container proximate the base portion.

5. The device of claim 1 and further comprising a spring-loaded coil attached to the container proximate the base portion, the tether disposable upon the spring-loaded coil to provide retractable action to the tether.

6. The device of claim 1 wherein the cap member is rotatably positionable about the second circumferential wall in a plane parallel to the base portion.

7. The device of claim 1 wherein the cap member further includes a frustoconical peripheral lip positionable between the first and second circumferential walls, wherein the lip contains the second slotted aperture.

8. An anti-theft device for anchoring a vehicle to the ground, the device comprising:
 a container comprising:
  a major base member; and
  a first circumferential wall extending from the major base member;
 a second circumferential wall at least partially disposed within the container and fixedly attached to the first circumferential wall;
 a minor base member disposed between and connecting the first and second circumferential walls, the minor base member containing a first slot;
 a cap member disposable within the container about the second circumferential wall and upon the minor base member, the cap member rotatably positionable in a plane parallel to the major base member, the cap member including a second slot cooperably alignable with the first slot; and
 a flexible tether disposable within the container, the tether having a length greater than a height of the container, whereupon positioning the cap member to align the second slot with the first slot, the tether is slidably disposable through the first slot and the second slot and connectable to the vehicle.

9. The device of claim 8 and further comprising a spring-loaded coil attached to the container proximate the major base member, the tether disposable upon the spring-loaded coil to provide retractable action to the tether.

10. The device of claim 8 wherein the cap member further includes a peripheral lip disposable between the first and second circumferential walls, wherein the peripheral lip contains the second slot.

11. The device of claim 8 wherein the first circumferential wall extends askew from the major base member and the second circumferential wall is positioned perpendicular to the major base member.

12. A tethering device positionable within the ground for securing an object to the ground, the tethering device comprising:
 a first base member having a first diameter;
 a first circumferential wall extending from the base member defining an aperture having a second diameter, the first base member and the first wall defining a container;
 a second circumferential wall at least partially positioned within the container, the second circumferential wall immovable relative to the first circumferential wall;
 a second base member positioned within the container between the first circumferential wall and the second circumferential wall, the second base member containing a first slot;
 a cap member at least partially disposable within the container and supportable by the second base member, the cap member containing a second slot; and
 a flexible tether disposable within the container having a first end connectable to the container and a second end connectable to the object to be secured, whereupon positioning the cap member to align the second slot with the first slot the tether is slidably disposable between the first and second slots.

13. The tethering device of claim 12, wherein the wall extends skewed from perpendicular relative to the first base member.

14. The tethering device of claim 12 and further comprising a spring-loaded coil attached to the container proximate the first base member, the tether disposable upon the spring-loaded coil to provide retractable action to the tether.

15. The device of claim 12 wherein the cap member further includes a peripheral lip disposable between the first and second circumferential walls, wherein the lip contains the second slot.

16. The device of claim 15 wherein the peripheral lip is frustroconical in construction.

17. The device of claim 12 wherein the second diameter is less than the first diameter.

18. The device of claim 12 wherein the second base member is positioned parallel to the first base member.

19. The device of claim 12 wherein the second base member fixedly connects the second wall to the first wall.

\* \* \* \* \*